United States Patent
Tichauer (10) Patent No.: US 9,742,823 B2
(45) Date of Patent: Aug. 22, 2017

(54) SYSTEM AND METHOD FOR IDENTIFYING RECIPIENTS DURING A COMMUNICATIONS SESSION

(71) Applicant: Vonage Business Inc., Atlanta, GA (US)

(72) Inventor: Royee Uriel Tichauer, Haifa (IL)

(73) Assignee: Vonage Business inc., Atlanta, GA (US)

( * ) Notice: Subject to any disclaimer, the term of this patent is extended or adjusted under 35 U.S.C. 154(b) by 86 days.

(21) Appl. No.: 14/330,071

(22) Filed: Jul. 14, 2014

(65) Prior Publication Data
US 2016/0014277 A1    Jan. 14, 2016

(51) Int. Cl.
| | |
|---|---|
| H04L 12/16 | (2006.01) |
| H04L 29/06 | (2006.01) |
| H04M 3/56 | (2006.01) |
| H04L 12/18 | (2006.01) |
| H04M 7/12 | (2006.01) |

(52) U.S. Cl.
CPC ...... *H04L 65/4053* (2013.01); *H04L 12/1827* (2013.01); *H04M 3/568* (2013.01); *H04M 7/1205* (2013.01); *H04M 2201/41* (2013.01)

(58) Field of Classification Search
CPC .......... H04M 3/42; H04M 1/56; H04M 15/06; G10L 17/00
USPC ........ 370/352–356, 260, 261, 262, 263, 266
See application file for complete search history.

(56) References Cited

U.S. PATENT DOCUMENTS

| | | | | |
|---|---|---|---|---|
| 7,305,078 B2 * | 12/2007 | Kardos | ................... | H04M 3/42 379/202.01 |
| 2009/0112589 A1 * | 4/2009 | Hiselius et al. | ........ | G10L 17/00 704/246 |

* cited by examiner

*Primary Examiner* — Hanh N Nguyen
(74) *Attorney, Agent, or Firm* — Moser Taboada; Joseph Pagnotta (57) ABSTRACT

Methods and systems for identifying intended recipients of remarks from a speaker in a communications session established among a plurality of participant devices are provided herein. In some embodiments, a method for identifying intended recipients of remarks from a speaker in a communications session established among a plurality of participant devices may include receiving an indication of a first participant to whom remarks are to be addressed; determining identification information associated with the first participant; and transmitting the identification information associated with the first participant to one or more of the plurality of participant devices.

16 Claims, 6 Drawing Sheets

FIG. 6

SYSTEM AND METHOD FOR IDENTIFYING RECIPIENTS DURING A COMMUNICATIONS SESSION

BACKGROUND

Field

Embodiments of the present invention generally relate to a method and system for identifying recipients during a communications session.

Description of the Related Art

Oftentimes during an audio call or conference call involving multiple participants, it is difficult to identify who is speaking or to whom the speaker's remarks are directed (i.e., the intended recipient(s) of the remarks). Calling out names may be impractical in conference calls that include a significant number of participants, especially when a question is directed to more than one recipient.

Therefore, there is a need in the art for identifying recipients during a communications session.

SUMMARY

In some embodiments, a method for identifying intended recipients of remarks from a speaker in a communications session established among a plurality of participant devices includes receiving an indication of a first participant to whom remarks are to be addressed; determining identification information associated with the first participant; and transmitting the identification information associated with the first participant to one or more of the plurality of participant devices In some embodiments, a method for identifying recipients during a communications session includes receiving a first message during a communication session, wherein the message comprises identification information associated with a first participant of the communication session and identification information associated with one or more second participants in the communication session, wherein the message indicates the first participant is to address remarks to the one or more second participants; and displaying the identification information received in the first message in a queue.

In some embodiments, a system for identifying intended recipients of remarks from a speaker in a communications session established among a plurality of participant devices includes a conference server configured to receive an indication of a first participant to whom remarks are to be addressed; determine identification information associated with the first participant; and transmit the identification information associated with the first participant to one or more of the plurality of participant devices.

In some embodiments, an apparatus for identifying intended recipients of remarks from a speaker in a communications session established among a plurality of participant devices includes a participant device configured to receive a first message during the communication session, wherein the message comprises identification information associated with a first participant of the communication session and identification information associated with one or more second participants in the communication session, wherein the message indicates the first participant is to address remarks to the one or more second participants, and storing the identification information received in the first message in a queue in a memory.

In some embodiments, a computer readable medium for storing computer instructions that, when executed by at least one processor causes the at least one processor to perform the method for identifying intended recipients of remarks from a speaker in a communications session established among a plurality of participant devices.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and system for identifying recipients during a communications session. A recipient is a participant on a conference call to whom another participant would like to address remarks. A participant of a conference call may select one or more recipients whom the participant would like to address. An indication is sent to some or all of the participants of the communication session to inform the participants that a specific one or more recipients are to be addressed.

In some embodiments, when a participant (e.g., Participant A) begins to speak, the participant is identified as a current speaker. The current speaker may select one or more recipients to whom the participant's remarks are directed. The current speaker selects one or more participants from a list of conference call participants. For example, the current speaker, Participant A, selects Participant B and Participant C as recipients. A message is sent to the devices of the conference call participants to inform them that the current remarks are being addressed to Participant B and Participant C. Participant A is displayed as the current speaker on the participant devices. Participant B and Participant C are displayed as recipients on the participant devices. Optionally, when the message is received, if the device is associated with a recipient, an alert may be provided (e.g., an audio or video alert) in order to make the recipient aware that he or she is about to be addressed on the conference call.

In some embodiments, a participant may indicate to whom the participant would like to address prior to becoming the speaker. For example, during a conference call, Participant A (i.e., a requestor) may wish to ask a question to Participant B (i.e., the recipient). Participant A selects Participant B from a list of conference call participants. A message is sent to the devices of the conference call participants to inform them that Participant A is going to address Participant B. Information that identifies the requestor and the recipient is displayed on each participant's device in a queue. A current speaker and recipient are also displayed on each participant's device. The display may include any identifying information about the participants, such as name, department, phone number, image, and the like. Optionally, when the message is received, if the device is associated with a recipient, an alert may be provided (e.g., an audio or video alert) in order to make the recipient aware that he or she is about to be addressed on the conference call. When Participant A addresses Participant B during the conference call, Participant A is identified as the current speaker. Each participant's display device is updated to reflect the current speaker and the one or more recipients to whom the speaker is addressing his or her comments. Participant A and Participant B are removed from the queue and a next requestor/recipient in the queue is displayed.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
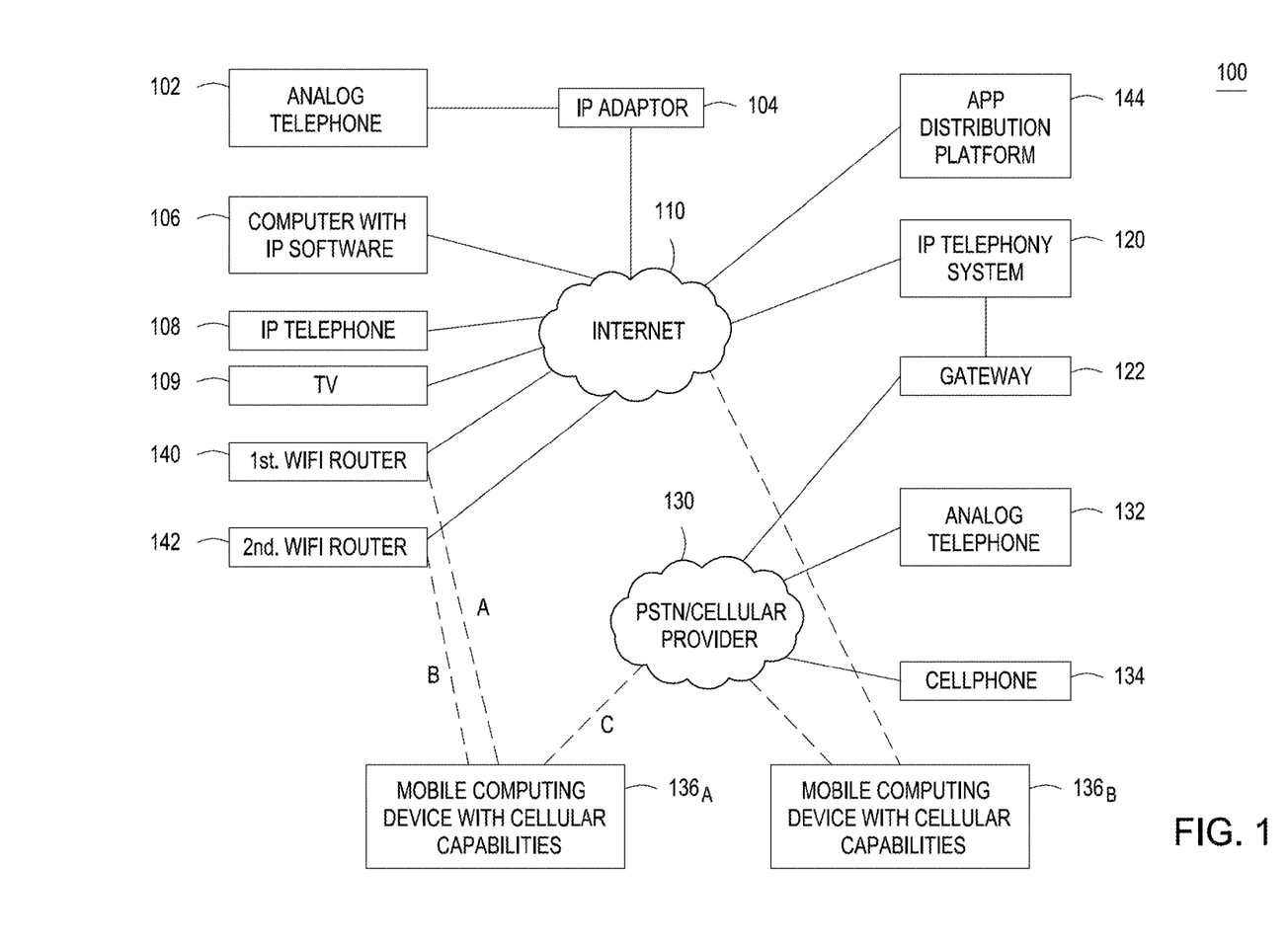
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a WiFi or WiMax router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the WIMAX standard. In the embodiments described above, a device may act as a mobile telephony device once it is configured with appropriate application software that may be downloaded from an app distribution platform 144. For example, mobile computing device $136_A$ may download a VOIP mobile app from app distribution platform 144 and install the VOIP mobile app on mobile computing device $136_A$.

Similarly, mobile computing device with cellular capabilities $136_B$ may also be coupled to internet 110 and/or cellular service provider 130. In some embodiments, mobile computing device $136_B$ may be connected to internet 110 via a WIFI or WIMAX connection, and the like, and can also establish a VOIP telephone calls with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

While the embodiments discussed herein include a centralized identification server that provides recipient information, additional embodiments include a decentralized system, where the end-user devices have the ability to communicate participant information to each other directly.

Figure 2:
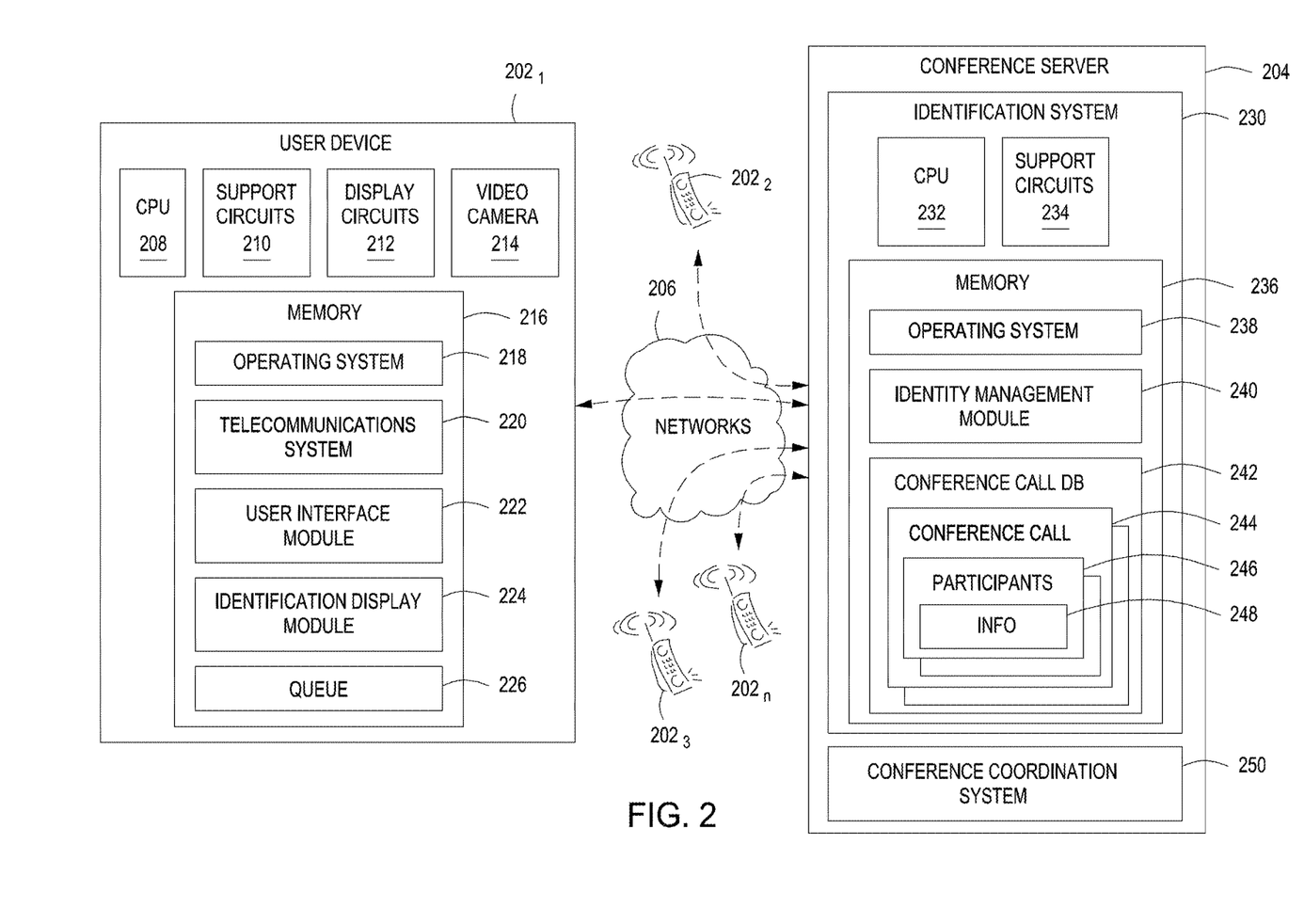
FIG. 2 depicts a block diagram of a system for identifying recipients during a communications session, according to one or more embodiments of the present invention.

FIG. 2 depicts a block diagram of a system 200 for identifying recipients during a communications session, according to one or more embodiments. The system 200 comprises a plurality of user devices $202_1$, $202_2$, $202_3$, . . . $202_n$ (collectively referred to as user device 202) and conference server 204 communicatively coupled via networks 206. In some embodiments, the user device 202 may be a mobile computing device (e.g., $136_A$) associated with a user, and conference server 204 may be a server maintained and operated by IP telephony system 120 described above in FIG. 1.

The user device 202 may comprise a Central Processing Unit (CPU) 208, support circuits 210, a display 212, a video camera 214, and a memory 216. The CPU 208 may comprise one or more commercially available microprocessors or microcontrollers that facilitate data processing and storage. The various support circuits 210 facilitate the operation of the CPU 208 and include one or more clock circuits, power supplies, cache, input/output device and circuits, and the like. The memory 216 comprises at least one of Read Only Memory (ROM), Random Access Memory (RAM), disk drive storage, optical storage, removable storage and/or the like. In some embodiments, the memory 216 comprises an operating system 218, a telecommunications module 220, a user interface module 222, an identification display module 224, and a queue 226. The queue 226 stores information regarding which participant (i.e., requestor) would like to address which recipient(s) after a current speaker has finished speaking.

The operating system (OS) 218 generally manages various computer resources (e.g., network resources, file processors, and/or the like). The operating system 218 is configured to execute operations on one or more hardware and/or software modules, such as Network Interface Cards (NICs), hard disks, virtualization layers, firewalls and/or the like. Examples of the operating system 218 may include, but are not limited to, various versions of LINUX, MAC OSX, BSD, UNIX, MICROSOFT WINDOWS, IOS, ANDROID and the like.

In some embodiments, the conference server 204 includes an identification system 230 and a conference coordination system 250. In some embodiments, the conference coordination system 250 may be a separate entity that provides conference coordination services to the conference server 204. Conference coordination services may include sending conference invitations, collecting participant responses, gathering participant information, coordinating conference call setup among participant devices, monitoring signaling from participant devices, and the like. The identification system 230 comprises a Central Processing Unit (CPU) 232, support circuits 234, and memory 236. The CPU 232 may comprise one or more commercially available microprocessors or microcontrollers that facilitate data processing and storage. The various support circuits 234 facilitate the operation of the CPU 232 and include one or more clock circuits, power supplies, cache, input/output circuits, and the like. The memory 236 comprises at least one of Read Only Memory (ROM), Random Access Memory (RAM), disk drive storage, optical storage, removable storage and/or the like.

In some embodiments, the memory 236 comprises an operating system 238, an identity management module 240, and a conference call database 242. The conference call database 242 maintains information associated with conference calls in progress. The conference call database 242 includes information for one or more conference calls 244. Each conference call 244 includes a plurality of participants $246_1$, $246_2$, $246_3$, . . . , $246_n$ (collectively referred to as participant 246). A participant $246_1$ to whom another participant $246_2$ would like to address remarks is herein referred to as recipient (e.g., $246_1$ is a recipient). Each participant 246 includes information 248 that identifies the participant 246. In some embodiments, information 248 that identifies the participant 246 may be provided automatically based on the participant device 202, or retrieved from previously stored information of the participant 246. In some embodiments, information 248 that identifies the participant 246 may be requested by the identity management module 240 when the participant 246 joins the conference call 244. In some embodiments, the identity management module 240 may request the information 248 when a participant 246 responds to an invitation to participate in the conference call 244. In some embodiments, information 248 includes, but is not limited to, a user device identifier, a name, company, department, phone number, digital photo, and the like. In some embodiments, the participant 246 provides information 248 such as an audio representation of the participant's voice (i.e., voice samples) which may be used during the conference call 244 to identify the participant 246.

The OS 238 generally manages various computer resources (e.g., network resources, file processors, and/or the like). The operating system 238 is configured to execute operations on one or more hardware and/or software modules, such as Network Interface Cards (NICs), hard disks, virtualization layers, firewalls and/or the like. Examples of the operating system 238 may include, but are not limited to, LINUX, MAC OSX, BSD, UNIX, MICROSOFT WINDOWS, IOS, ANDROID and the like.

The networks 206 comprise one or more communication systems that connect computers by wire, cable, fiber optic and/or wireless link facilitated by various types of well-known network elements, such as hubs, switches, routers, and the like. The networks 206 may include an Internet Protocol (IP) network 110, a public switched telephone network (PSTN) 130, or other mobile communication networks listed above, and may employ various well-known protocols to communicate information amongst the network resources.

In some embodiments, the conference coordination system 250 establishes a conference call between user devices 202. As each participant 246 associated with a user device 202 joins the conference call 244, the participant 246 is prompted to provide identifying information 248. Each participant 246 is associated with a user device 202. In some instances, two or more participants 246 are associated with a single user device 202 when, for example, a group of people have joined the conference using a single phone.

Once the conference call 244 is set up and running, the identity management module 240 detects the presence of a current speaker on the conference call 244. In some embodiments, the conference coordination system 250 calculates a sound intensity for each signal received from each of the user devices 202. Sound intensity may be calculated as described in further detail in "Measurement of Sound Intensity and Sound Power", by Vihn Trinh, published 1993 by DTSO Material Research Laboratory in MRL-TR-93-32, which is herein incorporated by reference in its entirety. The current speaker may be determined to be the participant 246 associated with the user device 202 having signal with the largest calculated sound intensity. In some embodiments, the conference coordination system 250 determines one or more signals from the user devices 202 that exceed a pre-defined intensity threshold. If only one signal exceeds the intensity threshold, the participant 246 associated with the user device 202 that sent the signal is determined to be the current speaker. In some embodiments, if more than one signal exceeds the intensity threshold, the first participant 246 to exceed the threshold may be determined to be the current speaker. In some embodiments, if more than one signal exceeds the intensity threshold, no current speaker is identified. In some embodiments, if more than one signal exceeds the intensity threshold, each participants 246 associated with user devices 202 for each signal that exceeds the intensity threshold is determined to be a current speaker.

In some embodiments, determining the current speaker involves using voice detection software. In such embodiment, the conference coordination system 250 detects the current speaker by comparing a received audio signal with a pre-stored voice signal for each participant 246. The participant 246 associated with the voice signal that matches the received audio signal is determined to be the current speaker.

Information 248 that identifies the participant determined to be the current speaker is transmitted to the user devices 202. Identification information 248 may include a name, company, image, or any information that is stored in information 248 to identify the current speaker.

The information is sent to each user device 202. The information is transmitted based on the connection type of each user device 202. For example, if the user device 202 is connected through the Internet, the information may be sent using a Transmission control Protocol/Internet Protocol (TCP/IP) connection. If the user device 202 is connected through a publicly switched telephone network (PSTN) or if the participant 246 has a connection through the Internet, but does not have a display screen on the user device 202, the conference server 204 may use a text-to-speech algorithm to create an audio sound that identifies the current speaker, such as the current speaker's name.

The identification display module 224 of each user device 202 displays the speaker information on the display 212. As previously discussed, participants 246 using PSTN and participants 246 associated with a user device 202 that does not have a display 212, only audio is received that may identify the name, company, department, location or any other information 248 stored by the identification system 230. Each PSTN participant may configure what information 248 is to be heard when a new speaker is detected in order to avoid too much information being heard when a participant 246 starts speaking.

For participants 246 with an Internet connection and a display 212, the identification display module 224 displays the information on the display 212. In some embodiments, the current speaker information is displayed during the entire call. In some embodiments, the information is displayed for a pre-defined period of time, for example, five seconds. In some embodiments, the identification display module 224 does not display the information unless an interactive element, for example, a button on the display 212 is selected, at which time the identification display module displays the information.

If the conference call 244 is a video conference, in some embodiments, the identification display module 224 partitions the display screen 212 at the start of the video conference in order to designate a portion of the display 212 for displaying the information. In some embodiments, a popup window containing the information is displayed for a pre-defined period of time and may be redisplayed upon selection of an interactive element on the display 212.

In some embodiments, a participant 246 may identify recipients 246 when the participant 246 is identified as the current speaker. The participant 246 may select one or more recipients 246 to whom the participant 246 is addressing remarks. The participant 246 selects the one or more recipients 246 from a list of participants 246. The telecommunications module 220 sends an indication (i.e., signal/message) to the conference server 204 indicating the one or more recipients 246. The telecommunications module 220 may send the indication to the conference server 204 as a proprietary Session Initiation Protocol (SIP) header, dual tone multi frequency (DTMF) signaling, a Transmission Control Protocol (TCP) message, User Datagram Protocol (UDP) message, Hypertext Transfer Protocol (HTTP) message, or the like. The identity management module 240 parses the indication. The identity management module 240 extracts the one or more recipients 246 from the indication. The identity management module 240 retrieves identity information 248 for each recipient 246. The identity management module 240 generates a message that includes identification information for each of the one or more recipients 246 and transmits the message to the user devices 202. Upon receipt of the message from the conference server 204, the identification display module 224 of each user device 202 displays the identification information for each of the one or more recipients 246 thereby allowing all participants 246 to see who is being addressed by the current speaker.

A participant 246 (i.e., the requestor) may use the user interface module 222 to select one or more recipients 246 to whom the participant 246 would like to address remarks. The telecommunications module 220 sends an indication (i.e., signal/message) to the conference server 204 indicating the one or more recipients 246. The indication includes an identifier of the user device 202 of the participant 246 who is sending the indication as well as identifiers of the selected one or more recipients 246. In some embodiments, the requestor may opt to include an identifier of the current speaker at the time the indication is transmitted and/or a portion of text of that was spoken in a predefined number of seconds before the indication is sent in order to provide context to the recipients (e.g., should the requestor's remarks be in reference to a comment made during the conference call). While the conference call is in progress, the call is recorded. When a requestor selects to include the portion of text that was spoken before the indication is transmitted, the audio from a predefined number of seconds of the conference call that were spoken before the indication is transmitted are converted to text using an audio-to-text conversion algorithm. In some embodiments, the requestor may identify a start and end time in the conference call that identifies the part of the conference call that is to be converted to text. In some embodiments, the indication includes one or more participants 246 who are to receive the indication. The telecommunications module 220 may send the indication to the conference server 204 as a proprietary Session Initiation Protocol (SIP) header, dual tone multi frequency (DTMF) signaling, a Transmission Control Protocol (TCP) message, User Datagram Protocol (UDP) message, Hypertext Transfer Protocol (HTTP) message, or the like.

The identity management module 240 parses the indication to extract the user device 202 from where the indication was received. The identity management module 240 also extracts the one or more recipients 246 from the indication. The identity management module 240 retrieves identity information 248 for each recipient 246. The identity management module 240 also retrieves identity information 248 for the participant 246 associated with the user device 202 from where the indication was received. The identity management module 240 generates a message that includes identification information of the participant 246 associated with the user device 202 from where the indication was received, identification information for each of the one or more recipients 246, as well as identification of the current speaker and the portion of text sent in the indication. The identity management module 240 transmits the message to the user devices 202. In some embodiments, the message is transmitted to the user device 202 of each participant 246. In some embodiments, the message is transmitted to the user device 202 of each recipient 246. In some embodiments, the message is transmitted to the user device 202 of only those participants 246 specified in the indication.

Upon receipt of the message from the conference server 204, the identification display module 224 of each user device 202 that receives the message adds the information in the message to the queue 226. When the participant 246 in the queue 226 is identified as a current speaker, the recipients 246 listed in the queue 226 are displayed as recipients on the user device 202.

In some embodiments, the identification display module 224 may display the participant/recipient(s) who are next in the queue. In some embodiments, the identification display module 224 may display a user-defined number of participant/recipient(s) at the front of the queue.

As the conference call progresses, the conference server 204 continues to transmit information regarding a current speaker as well as identity information associated with recipient indications received from participants.

Upon receipt of a message identifying a new speaker, the identification display module 224 determines whether the identity of the new speaker matches either the participant or one of the recipients listed at the front of the queue 226. If the identity matches, the participant and recipient(s) at the top of the queue 226 are displayed as the current speaker and current participant(s). The display 212 is updated to remove the participant and recipient(s) from the queue display. If a current speaker and portion of text that were provided with the indication are stored in the queue 226 along with the participant/recipient(s), the current speaker and portion of text are displayed. This display provides context to the recipient(s) who are being addressed. It allows the recipient(s) to see who was talking and what was being said at the time when the current speaker wanted to address remarks to the recipient(s). As long as the current speakers identified in messages from the conference server 204 match either the current speaker or recipient(s) displayed on the device 202, the speaker and recipient display does not change.

If the identity of the speaker in a message from the conference server 204 does not match the current speaker/recipient, or the participant/recipient first in the queue, then a participant is speaking out of turn. The identification display module 224 updates the identity of the current speaker in the display 212 and the identity of the recipient is left blank on the display 212. The conference server 204 continually checks for the current speaker at predefined time intervals, for example twice per second. In some embodiments, the queue display may be manually updated, for example, by a participant 246 designated as a facilitator or host. In the event that a participant 246 is in more than one area of the queue 226 because the participant 246 is a recipient in one area of the queue 226 and a speaker in another area of the queue 226 or if a participant 246 in the queue 226 has left the conference call 244, the facilitator may manually remove participant/recipient entries from the queue 226 to facilitate moving the queue display forward.

Figure 3:
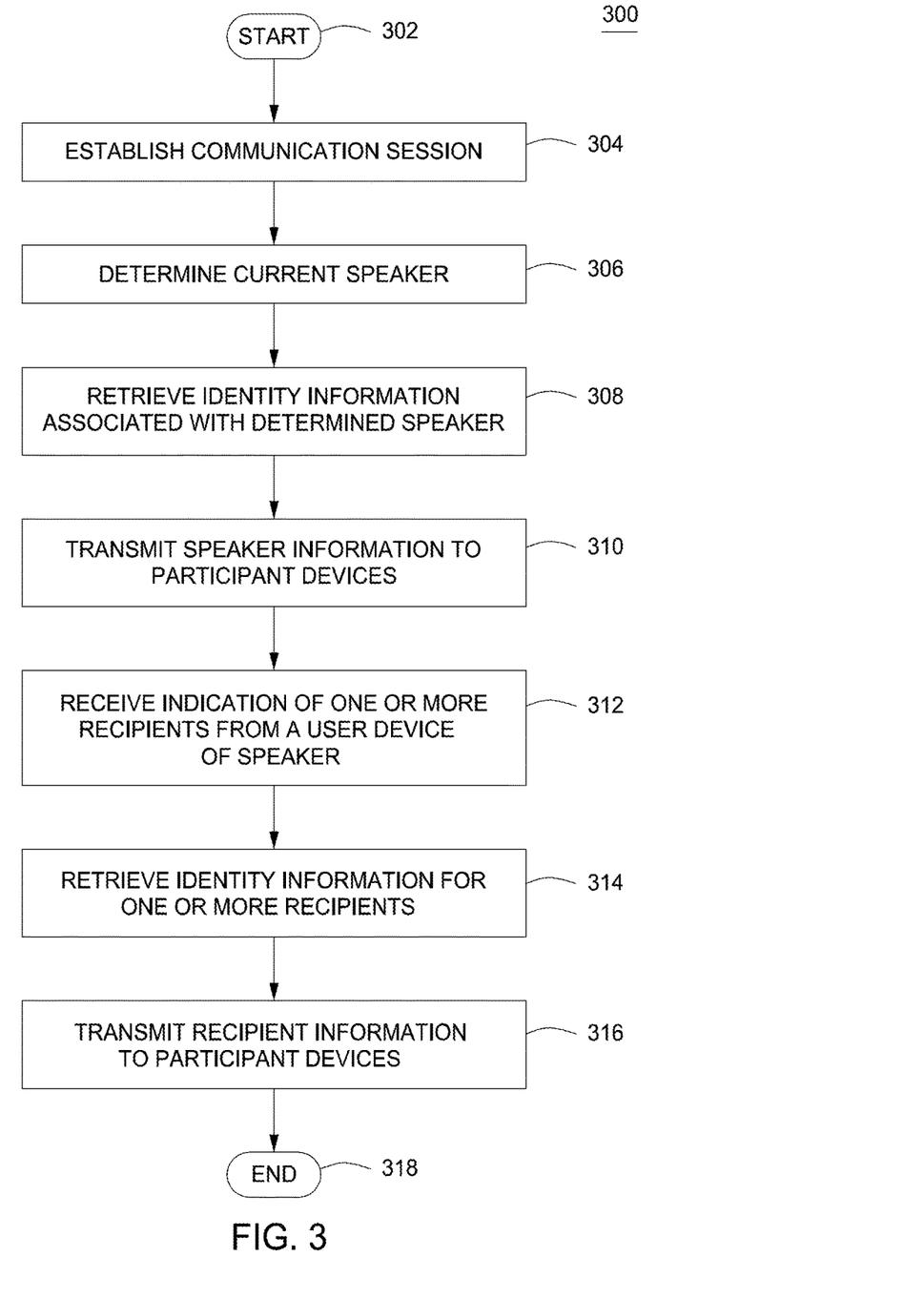
FIG. 3 depicts a flow diagram of a method for identifying speakers and recipients in a communication session, in accordance with one or more embodiments of the present invention.

FIG. 3 depicts a flow diagram of a method 300 for identifying speakers and recipients in a communication session, in accordance with one or more embodiments of the present invention. The method 300 may be performed using one or more of the modules described above with respect to FIG. 2. The method 300 describes an embodiment whereby a current speaker identifies one or more recipients the current speaker is addressing. The method 300 starts at step 302 and proceeds to step 304.

At step 304, a communication session, for example, a conference call is established. The conference call includes a plurality of telephony devices participating in the conference call. The telephony devices may include smartphones, PSTN phones, and the like. The connection may be via a bridge for PSTN and ISDN or a multipoint control unit (MCU) for VoIP. The conference call may include voice and/or video transmissions. In some embodiments, as each device connects with the conference call, the participant associated with the device provides identifying information, which is stored in a database on a server. The participant may be asked to provide a name, department, phone number, identifying image, and the like. In some embodiments, the participant's identifying information may be requested at the time the participant accepts an invitation to the conference call. In some embodiments, the participant's identifying information may be stored from a previous call. In some embodiments, caller identification data extracted from incoming signals from the data channel for the user device and the extracted caller identification data is used as identifying information.

The method 300 proceeds to step 306, where a current speaker is determined. In some embodiments, the participant associated with the user device 202 that is transmitting what is determined to be the dominant media transmission is determined to be the current speaker. In some embodiments, in order to determine the dominant media transmission, a sound intensity is calculated for each signal received from each of the user devices. The current speaker may be determined to be the participant associated with the user device having signal with the largest calculated sound intensity. In some embodiments, for each signal received from a user device it is determined whether the signal exceeds a pre-defined intensity threshold. If only one signal exceeds the intensity threshold, the participant associated with the user device that sent the signal is determined to be the current speaker. In some embodiments, if more than one signal exceeds the intensity threshold, the first participant to exceed the threshold may be determined to be the current speaker. In some embodiments, if more than one signal exceeds the intensity threshold, each participant associated with the user devices for each signal that exceeds the intensity threshold is determined to be a current speaker. In the event that a user device is associated with a plurality of participants the current speaker is determined using voice recognition. When a signal is received from a user device associated with a group, voice recognition algorithms are used to compare the received audio signal with the participant voice samples of the participants in the group. The current speaker is identified by at least one of a unique participant identifier or a device identifier.

The method 300 proceeds to step 308, where the identity management module 240 retrieves information 248 associated with the participant 246 that is determined to be the current speaker. The information 248 associated with the identifier of the current speaker is retrieved from the conference call database. The information may include a name, company, image, and the like that uniquely identifies the current speaker. The identity management module generates a message that includes the identity information in addition to an indication that the identity information is for the current speaker.

The method 300 proceeds to step 310, where the message is transmitted to the user devices of the participants on the conference call. The identity management module 240 then transmits the speaker information to the user devices specified in the indication. The message may be an Extensible Markup Language (XML) message. The message may be transmitted using a Transmission Control Protocol/Internet Protocol (TCP/IP) connection.

At step 312, an indication is received from the user device of the current speaker. The indication identifies the participants on the conference call who are being addressed by the current speaker. The indication includes an identifier of one or more recipients to whom the current speaker is addressing comments.

At step 314, identity information associated with the one or more recipients is retrieved from a database on a conference server. Prior to the start of the conference call, each participant provided identifying information that was stored in the conference server database, for example, conference call database 242. A message is generated that includes identity information associated with each of the one or more recipients.

At step 316, the message is transmitted to the user devices of the participants. The message may be an XML message transmitted using a TCP/IP connection. In some embodiments, the message is transmitted to the one or more specified recipients. Upon receipt of the message, each user device may update its display to show who is being addressed by the current speaker. The method 300 ends at step 318.

Figure 4:
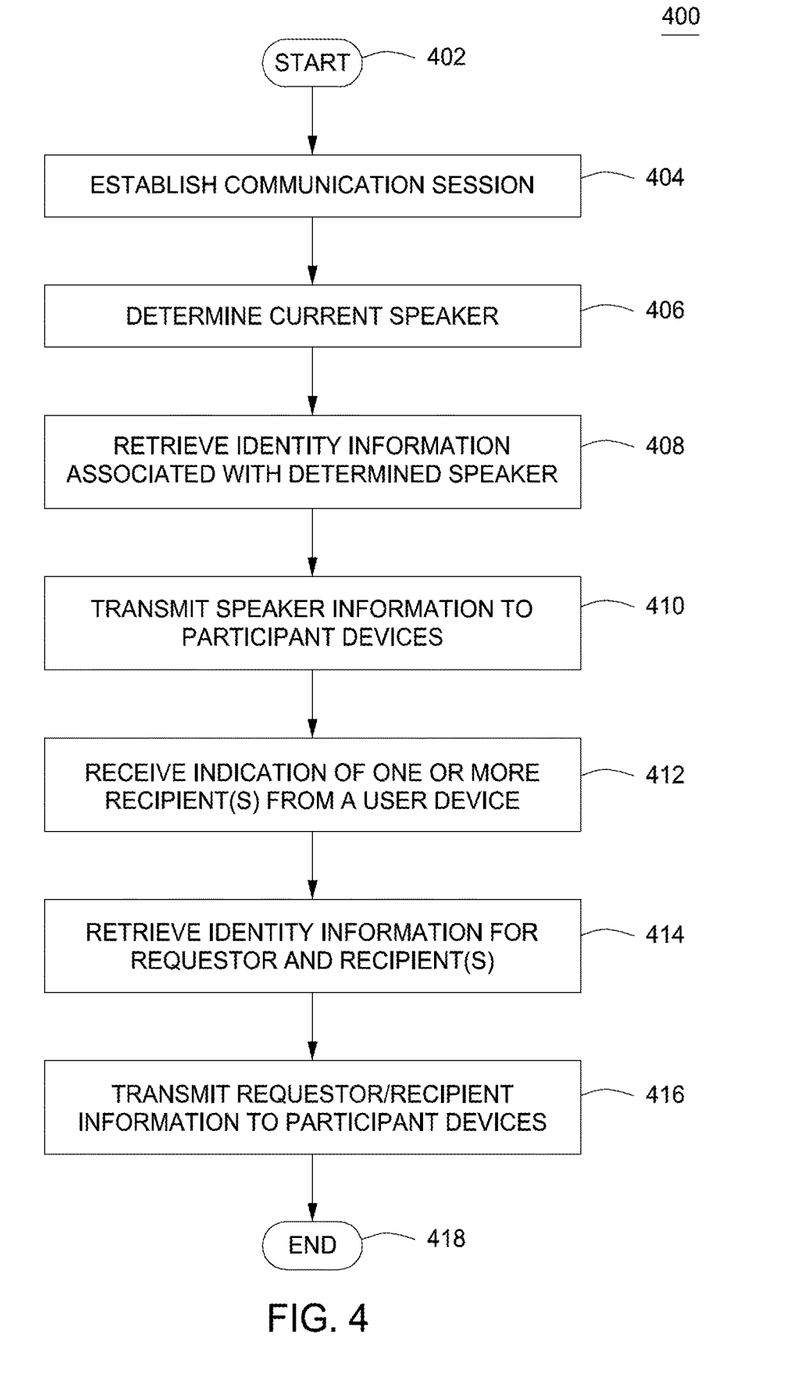
FIG. 4 depicts a flow diagram of a method for identifying speakers and recipients in a communication session, in accordance with one or more embodiments of the present invention.

FIG. 4 depicts a flow diagram of a method 400 for identifying speakers and recipients in a communication session, in accordance with one or more embodiments of the present invention. The method 400 may be performed using one or more of the modules described above with respect to FIG. 2. The method 400 describes one or more embodiments where a participant identifies recipients whom the participant wishes to address. The method 400 starts at step 402 and proceeds to step 404.

At step 404, a communication session, for example, a conference call is established. The conference call includes a plurality of telephony devices participating in the conference call. The telephony devices may include smartphones, PSTN phones, and the like. The connection may be via a bridge for PSTN and ISDN or a multipoint control unit (MCU) for VoIP. The conference call may include voice and/or video transmissions. In some embodiments, as each device connects with the conference call, the participant associated with the device provides identifying information, which is stored in a database on a server. The participant may be asked to provide a name, department, phone number, identifying image, and the like. In some embodiments, the participant's identifying information may be requested at the time the participant accepts an invitation to the conference call. In some embodiments, the participant's identifying information may be stored from previous call. In some embodiments, caller identification data extracted from incoming signals from the data channel for the user device and the extracted caller identification data is used as identifying information.

The method 400 proceeds to step 406, where a current speaker is determined. In some embodiments, the participant associated with the user device 202 that is transmitting what is determined to be the dominant media transmission is determined to be the current speaker. In some embodiments, in order to determine the dominant media transmission, a sound intensity is calculated for each signal received from each of the user devices. The current speaker may be determined to be the participant associated with the user device having signal with the largest calculated sound intensity. In some embodiments, for each signal received from a user device it is determined whether the signal exceeds a pre-defined intensity threshold. If only one signal exceeds the intensity threshold, the participant associated with the user device that sent the signal is determined to be the current speaker. In some embodiments, if more than one signal exceeds the intensity threshold, the first participant to exceed the threshold may be determined to be the current speaker. In some embodiments, if more than one signal exceeds the intensity threshold, each participant associated with the user devices for each signal that exceeds the intensity threshold is determined to be a current speaker. In the event that a user device is associated with a plurality of participants the current speaker is determined using voice recognition. When a signal is received from a user device associated with a group, voice recognition algorithms are used to compare the received audio signal with the participant voice samples of the participants in the group. The current speaker is identified by at least one of a unique participant identifier or a device identifier.

The method 400 proceeds to step 408, where the identity management module 240 retrieves information 248 associated with the participant 246 that is determined to be the current speaker. The information 248 associated with the identifier of the current speaker is retrieved from the conference call database. The information may include a name, company, image, and the like that uniquely identifies the current speaker. The identity management module generates a message that includes the identity information in addition to an indication that the identity information is for the current speaker.

The method 400 proceeds to step 410, where the message is transmitted to the user devices of the participants on the conference call. The identity management module 240 then transmits the speaker information to the user devices specified in the indication. The message may be an Extensible Markup Language (XML) message. The message may be transmitted using a Transmission Control Protocol/Internet Protocol (TCP/IP) connection. The user devices receive the message and display the speaker information as described in further detail with respect to FIG. 5 below.

At step 412, an indication is received from a user device. The indication allows the participants on the conference call to be aware that someone would like to address one or more other participants on the conference call without yelling over the current speaker. The indication includes an identifier of the participant associated with the user device from which it was received (i.e., the requestor). The indication also includes an identifier of one or more recipients to whom the requestor would like to address comments. The indication may also include the current speaker at the time the requestor sent the indication. The indication may also include a portion of text that was spoken on the conference call during a predefined period of time, for example, ten seconds, before the indication was sent. The current speaker and portion of text provide context to the participants so the participants are aware of a topic of discussion that may be related to the requestor's remarks.

At step 414, identity information associated with the requestor and the one or more recipients is retrieved from a database on a conference server. Prior to the start of the conference call, each person (e.g., requestor or participant) provided identifying information that was stored in the conference server database, for example, conference call database 242. Each person is associated with a user device, such that when a signal comes from said user device, the participant database is searched to retrieve the identity information. A message is generated that includes identity information associated with the requestor. The message also includes identity information associated with each of the one or more recipients. The message may also include the current speaker at the time the requestor sent the indication and/or the portion of text that was spoken on the conference call before the indication was sent. The current speaker and portion of text may be included in the indication if the requestor needs to, for example, ask a question to one or more recipients in reference to what was being said when the request was made. Other information may be included in the message such as a timestamp or any additional information that may be informative in the message.

At step 416, the message is transmitted to one or more of the user devices. In some embodiments, the message is transmitted to all user devices on the conference call. The message may be an XML message transmitted using a TCP/IP connection. In some embodiments, the message is transmitted to the one or more specified recipients. In some embodiments, the message is transmitted to one or more participants as specified by the requestor and included in the indication. Upon receipt of the message, each user device updates its display as described in further detail with respect to FIG. 5 below. The method 400 ends at step 418.

Figure 5:
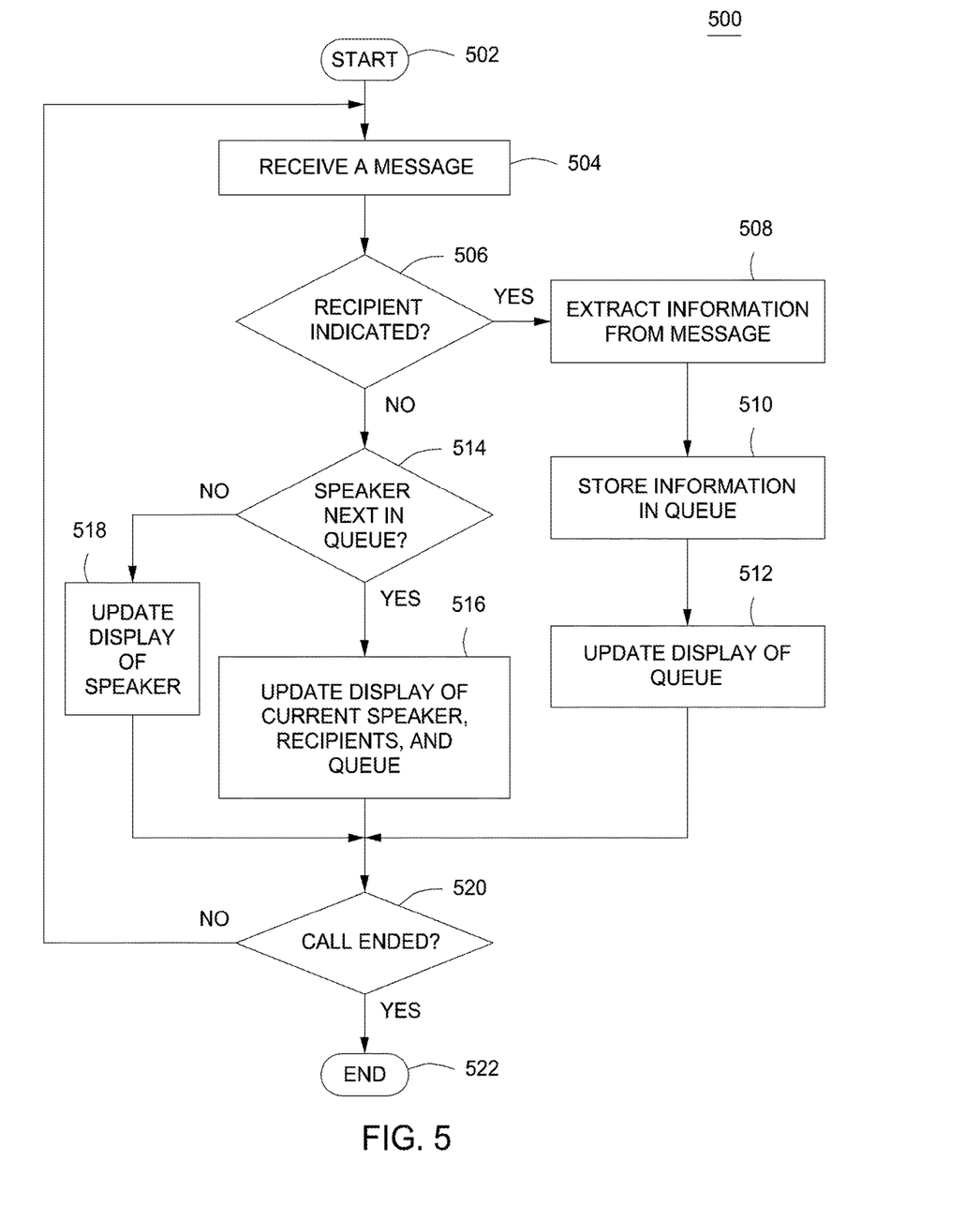
FIG. 5 depicts a flow diagram of a method for processing identification information received during a communication session, in accordance with one or more embodiments of the present invention.

FIG. 5 depicts a flow diagram of a method 500 for processing identification information received during a communication session, in accordance with one or more embodiments of the present invention. The method 500 is performed by the identification display module 224 of a user device. The display 212 of the user device 202 displays a current speaker in a conference call, one or more recipients to whom the current speaker is addressing comments, and a queue indicating which participant is waiting to address which participant(s) after the current speaker has finished speaking. The method 500 starts at step 502 and proceeds to step 504.

At step 504, a message is received from an identification server. The message may indicate a current speaker on a conference call, or the message may indicate one or more recipients to whom a requestor would like to address remarks. The method 500 proceeds to step 506.

At step 506, the message is parsed to determine whether one or more recipients are identified in the message. If one or more recipients are identified in the message, the method 500 proceeds to step 508.

At step 508, the identification information in the message is extracted. The information may include the requestor's name, phone number, photo, or any information provided when the requestor joined the call. The information is also extracted for the one or more recipients. In some embodiments, a current speaker and text of what was spoken is also extracted, if such information was sent by the requestor.

At step 510, if a queue of requestors/recipients does not already exist, a queue is created to include the extracted information and stored in a memory of the user device. If the queue already exists, the extracted information is added to the bottom of the queue. The queue identifies participants who are waiting to speak on the conference call and recipient to whom they wish to address comments or questions.

At step 512, the display is updated with the current state of the queue. In some embodiments, only one requestor/recipient entry is displayed on a display screen of the user device. The display informs the participants on the conference call who is waiting to speak when the current speaker has finished. In some embodiments, a predefined number of requestor/recipient entries are displayed on the display screen of the user device. In some embodiments, all requestor/recipient entries are displayed on the display screen of the user device. If space on the display screen does not allow for a plurality of requestor/recipient entries to be viewed, a scroll bar may be implemented to view the entries. The method 500 proceeds to step 520.

However, if at step 506 it is determined that a current speaker is specified, rather than a recipient, the method 500 proceeds to step 514. At step 514, it is determined whether the current speaker identified in the message is a requestor or recipient that is next in the queue. The identification information is extracted from the message and compared to the identification information stored for the requestor and recipients at the top of the queue. If the current speaker is not a requestor or recipient that is next in the queue, the current speaker is speaking out of turn and the method 500 proceeds to step 518.

At step 518, the display is updated to identify the current speaker. If a recipient is displayed, the recipient identifying information is removed from the display. The method 500 proceeds to step 520.

However, if at step 514, the current speaker identification information matches one of either the requestor or recipient next in the queue, the method 500 proceeds to step 516.

At step 516, the display is updated with identification information for the current speaker and the one or more participants. The requester/recipient is removed from the top of the queue and the remaining requestor/recipient entries are moved up in the display of the queue. In some embodiments, the current speaker and portion of text spoken at the time the request was made are displayed. In some embodiments, the current speaker and portion of text spoken are displayed if the device is associated with the current speaker and recipient(s).

In some embodiments, the requestor/recipient is not removed from the top of the queue in memory, but rather a pointer indicates the location of requestor/recipient entry that is next to speak. In such embodiment, if a participant speaks out of turn, but the requestor/recipient later regain control of the conversation, the requestor/recipient information may be displayed using the identification information stored in the queue.

The method 500 proceeds to step 520, where it is determine whether the conference call has ended. If the call has not ended, the method 500 proceeds to step 504 and iterates until the call ends, at which time the method 500 ends at step 522.

Figure 6:
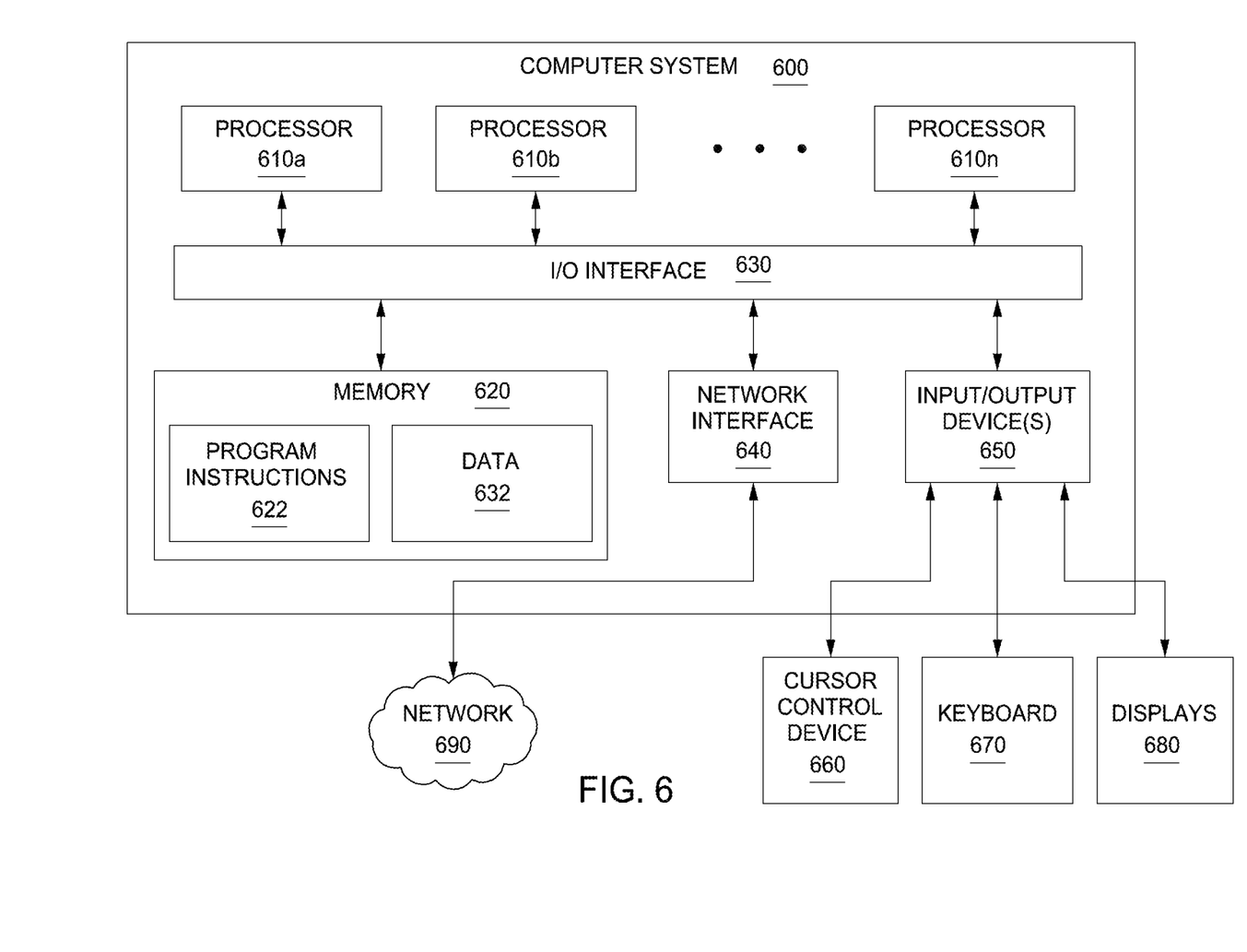
FIG. 6 is an exemplary diagram of a computer system for grouping participant devices in accordance with one or more embodiments of the present invention.

FIG. 6 is an exemplary diagram of a computer system 600 for identifying recipients during a communications session in accordance to one or more embodiments of the present invention. The computer system 600 includes substantially similar structure comprising servers or electronic devices in the aforementioned embodiments.

Various embodiments of methods and system authenticating users for communication sessions, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 400 and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to authenticate a user as described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display devices, keyboards, keypads, cameras, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIGS. 3, 4 and 5. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for identifying intended recipients of remarks from a speaker in a communications session established among a plurality of participant devices, comprising:
    receiving an indication of a first participant to whom remarks are to be addressed;
    determining identification information associated with the first participant;
    transmitting the identification information associated with the first participant to one or more of the plurality of participant devices;
    identifying a current speaker in the communication session;
    determining identification information associated with the current speaker in the communication session;
    transmitting the identification information associated with the current speaker to the plurality of participant devices;
    identifying a signal for a media transmission from each of the plurality of devices;
    determining that a sound intensity of one or more signals is above a predefined threshold;
    identifying from the determined one or more signals with the sound intensity above a predefined threshold, the signal with a greatest sound intensity; and
    identifying participant information associated with the device of the plurality of devices identified as having the signal with the greatest sound intensity.

2. The method of claim 1, further comprising:
    determining identification information associated with a second participant associated with a second device of the plurality of participant devices from where the indication was received; and
    transmitting the identification information associated with the second participant associated with the second device to one or more of the plurality of participant devices.

3. The method of claim 1, further comprising:
    receiving an indication of a second participant to whom remarks are to be addressed;
    determining identification information associated with the second participant; and
    transmitting the identification information associated with the second participant to one or more of the plurality of participant devices.

4. The method of claim 1, wherein the identification information includes at least one of a name, department, company, or image associated with the first participant.

5. The method of claim 1, wherein the indication comprises a portion of text of the communication session that was spoken within a predefined number of seconds before the first participant was selected, wherein the portion of text is generated using an audio-to-text algorithm.

6. The method of claim 1, wherein the indication comprises an identifier of a participant who was a current speaker when the indication was received.

7. A method for identifying intended recipients of remarks from a speaker in a communications session established among a plurality of participant devices comprising:
    receiving a first message during a communication session, wherein the first message comprises identification information associated with a first participant of the communication session and identification information associated with one or more second participants in the communication session, wherein the message indicates the first participant is to address remarks to the one or more second participants;
    storing the first participant and the one or more second participants in a queue in a memory;
    identifying a current speaker in the communication session;
    determining identification information associated with the current speaker in the communication session;
    transmitting the identification information associated with the current speaker to the plurality of participant devices;
    identifying a signal for a media transmission from each of the plurality of devices;
    determining that a sound intensity of one or more signals is above a predefined threshold;
    identifying from the determined one or more signals with the sound intensity above a predefined threshold, the signal with a greatest sound intensity; and
    identifying participant information associated with the device of the plurality of devices identified as having the signal with the greatest sound intensity.

8. The method of claim 7, further comprising displaying the identification information received in the first message.

9. The method of claim 7, further comprising:
    receiving a second message comprising identification information for a current speaker; and
    displaying the identification information for the current speaker.

10. The method of claim 9, further comprising:
    determining the identification information for the current speaker matches the identification information of the first participant in the queue; and
    updating the queue to remove the first participant and the one or more second participants.

11. The method of claim 10, further comprising:
    displaying the first participant in the queue as the current speaker; and
    displaying the one or more second participants in the queue as one or more recipients.

12. The method of claim 7, wherein the first message further comprises at least one of (i) an identifier of a current speaker at a time when the one or more second participants were identified or (ii) a portion of text of the communication session that was spoken within a predefined number of seconds before the one or more second participants were identified, and wherein at least one of the identifier of the current speaker or the portion of text is stored in the queue, and wherein the method further comprises displaying the current speaker at a time the one or more second participants were identified and the portion of text of the communication session that was spoken within a predefined number of seconds before the one or more second participants were identified.

13. A system for identifying intended recipients of remarks from a speaker in a communications session established among a plurality of participant devices, comprising:
    a conference server configured to:
        receive an indication of a first participant to whom remarks are to be addressed;
        determine identification information associated with the first participant;
        transmit the identification information associated with the first participant to one or more of the plurality of participant devices;
        identify a current speaker in the communication session;
        determine identification information associated with the current speaker in the communication session;
        transmit the identification information associated with the current speaker to the plurality of participant devices;
        identify a signal for a media transmission from each of the plurality of devices;
        determine that a sound intensity of one or more signals is above a predefined threshold;
        identify from the determined one or more signals with the sound intensity above a predefined threshold, the signal with a greatest sound intensity; and
        identify participant information associated with the device of the plurality of devices identified as having the signal with the greatest sound intensity.

14. A non-transitory computer readable medium for storing computer instructions that, when executed by at least one processor causes the at least one processor to perform a method for identifying intended recipients of remarks from a speaker in a communications session established among a plurality of participant devices, comprising:
    receiving an indication of a first participant to whom remarks are to be addressed;
    determining identification information associated with the first participant;
    transmitting the identification information associated with the first participant to one or more of the plurality of participant devices;
    identifying a current speaker in the communication session;
    determining identification information associated with the current speaker in the communication session;
    transmitting the identification information associated with the current speaker to the plurality of participant devices;
    identifying a signal for a media transmission from each of the plurality of devices;
    determining that a sound intensity of one or more signals is above a predefined threshold;
    identifying from the determined one or more signals with the sound intensity above a predefined threshold, the signal with a greatest sound intensity; and
    identifying participant information associated with the device of the plurality of devices identified as having the signal with the greatest sound intensity.

15. The computer readable medium of claim 14, further comprising:
    determining identification information associated with a second participant associated with a second device of the plurality of participant devices from where the indication was received;
    transmitting the identification information associated with the second participant associated with a second device to one or more of the plurality of participant devices;
    identifying a current speaker in the communication session;
    determining identification information associated with the current speaker in the communication session; and
    transmitting the identification information associated with the current speaker to the plurality of participant devices.

16. The computer readable medium of claim 14, wherein the indication comprises a portion of text of the communication session that was spoken within a predefined number of seconds before the first participant was selected, wherein the portion of text is generated using an audio-to-text algorithm, and wherein the indication further comprises an identifier of a participant who was a current speaker when the indication was received.

* * * * *